United States Patent [19]
Cole et al.

[11] Patent Number: 5,092,274
[45] Date of Patent: Mar. 3, 1992

[54] POULTRY FEEDER

[75] Inventors: Theodore J. Cole, Syracuse, Ind.; Ray Swartzendruber, Okemos, Mich.

[73] Assignee: CTB, Inc., Milford, Ind.

[21] Appl. No.: 605,756

[22] Filed: Oct. 30, 1990

[51] Int. Cl.⁵ .............................................. A01K 5/00
[52] U.S. Cl. ..................................... 119/57.4; 119/53
[58] Field of Search ................. 119/51.01, 52.4, 53, 119/61, 57.4, 52.1, 72.5

[56] References Cited

U.S. PATENT DOCUMENTS

| | | | |
|---|---|---|---|
| 1,154,073 | 9/1915 | Stocking | 119/52.4 |
| 4,348,988 | 9/1982 | Lawson | 119/53 |
| 4,476,811 | 10/1984 | Swartzendruber | 119/57.4 |
| 4,527,513 | 7/1985 | Hart et al. | 119/57.4 |
| 4,552,095 | 11/1985 | Segalla | 119/57.4 |
| 4,800,844 | 1/1989 | Van Gilst | 119/52.4 |
| 5,007,380 | 4/1991 | Badia et al. | 119/57.4 |

*Primary Examiner*—John G. Weiss
*Attorney, Agent, or Firm*—Trexler, Bushnell, Giangiorgi & Blackstone, Ltd.

[57] ABSTRACT

A unique feeder for birds and animals of the type forming part of a modern automated feeding system used to minimize the operating costs associated with commercial breeding. The feeder assembly comprises feeder tube means, a pan member and may include cone means loosely surrounding the feeder tube for controlling the pattern and amount of feed presented in the pan. Indexing means and visual indication means may also be provided for enabling the preselection of the size of a lower feed gate which automatically results when the feeder is suspended above a feeding surface, and providing constant indication of the size selected, respectively. A brood gate may also be provided which is designed to automatically close upon elevation of the feeder above a feeding surface, but which can also be locked open when so desired. The unique feeder may also include rotatable coupling means to engage and disengage the pan member and a barrier means by simply rotating one with respect to the other. The barrier means is designed to facilitate the egress of birds or animals which might otherwise be trapped inside the feeder and make ingress more difficult than egress. Moreover, the feeder is preferably provided with a hanger means to enable simultaneous suspension of the pan from the barrier means upon disengagement therefrom.

27 Claims, 7 Drawing Sheets

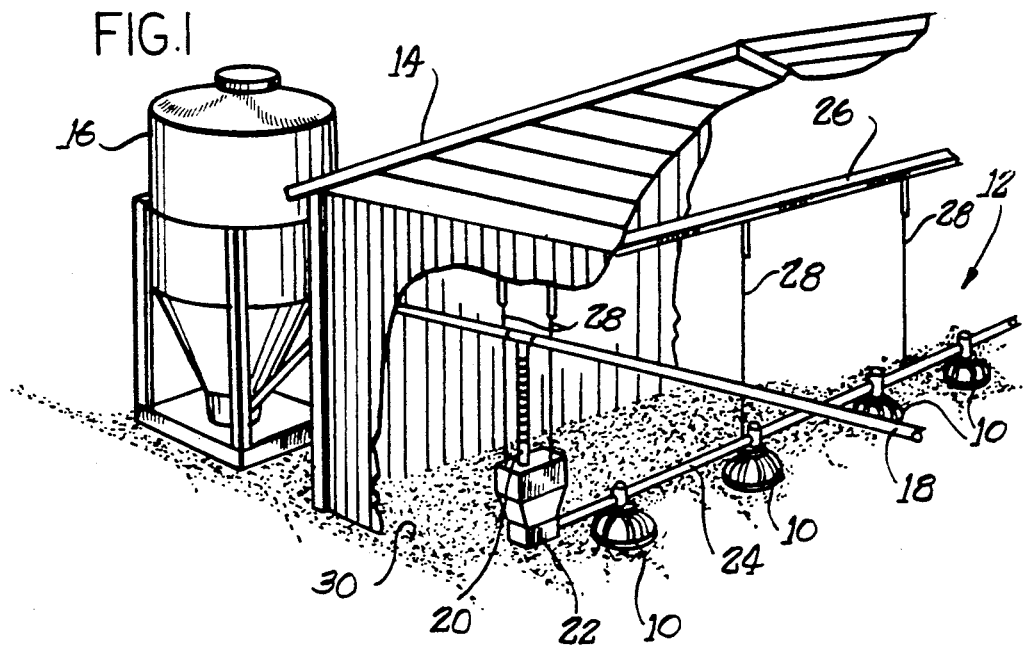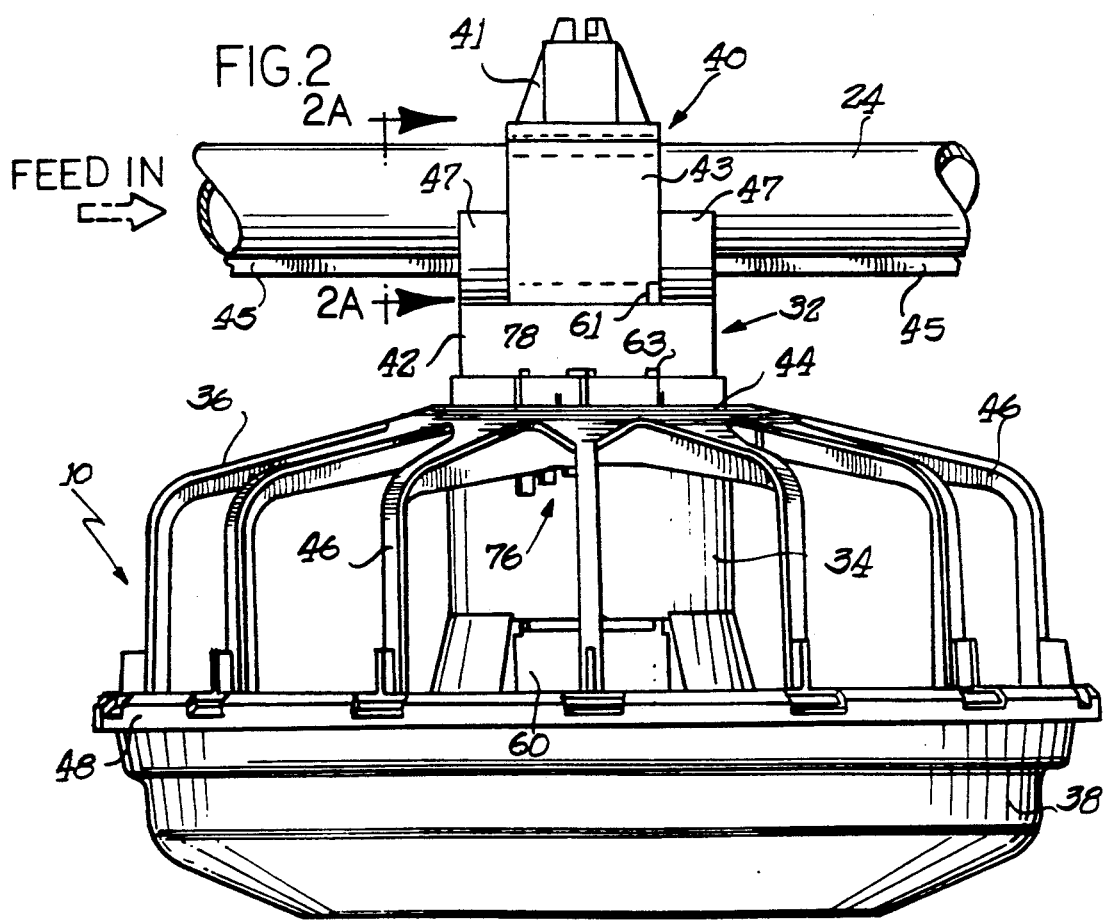

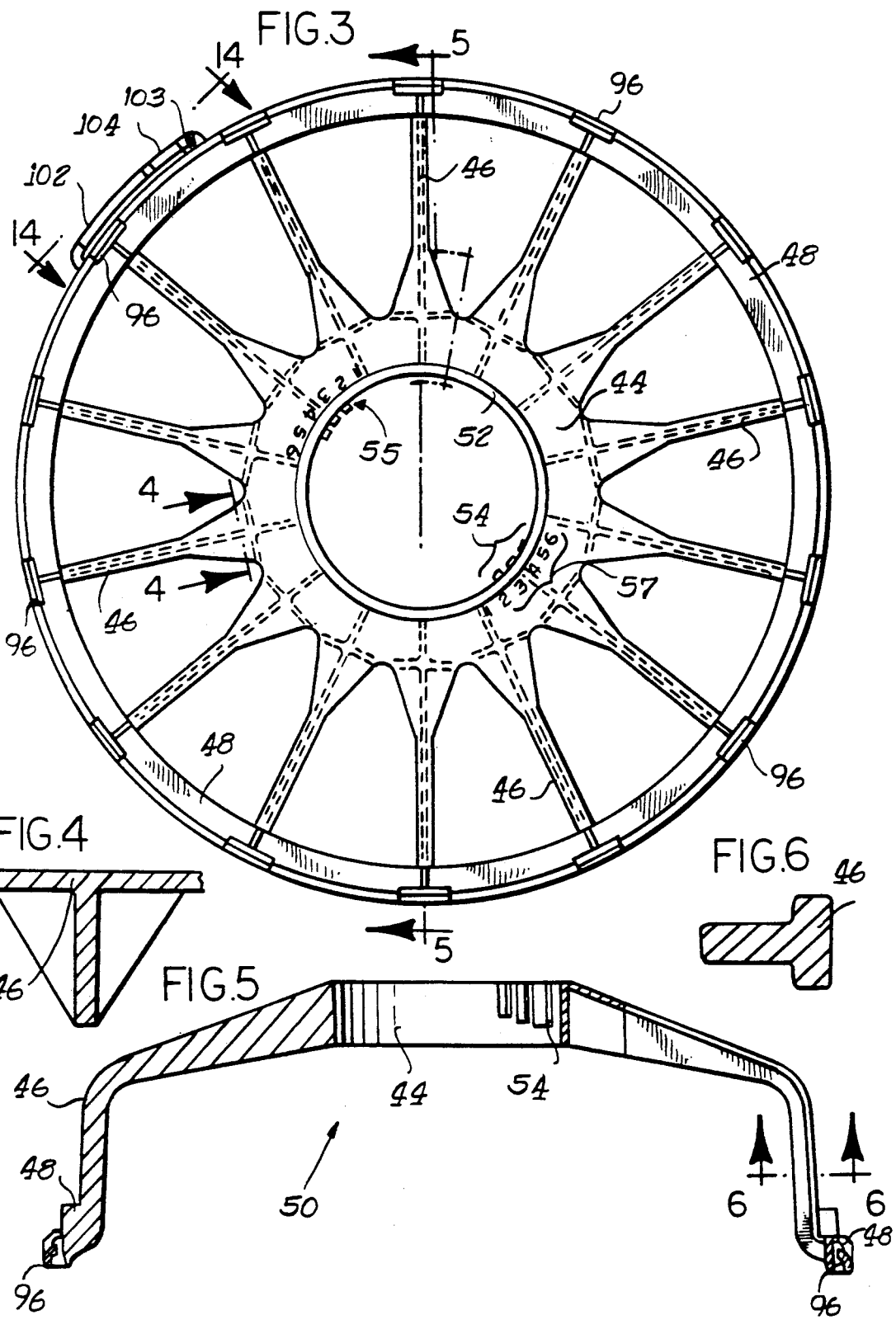

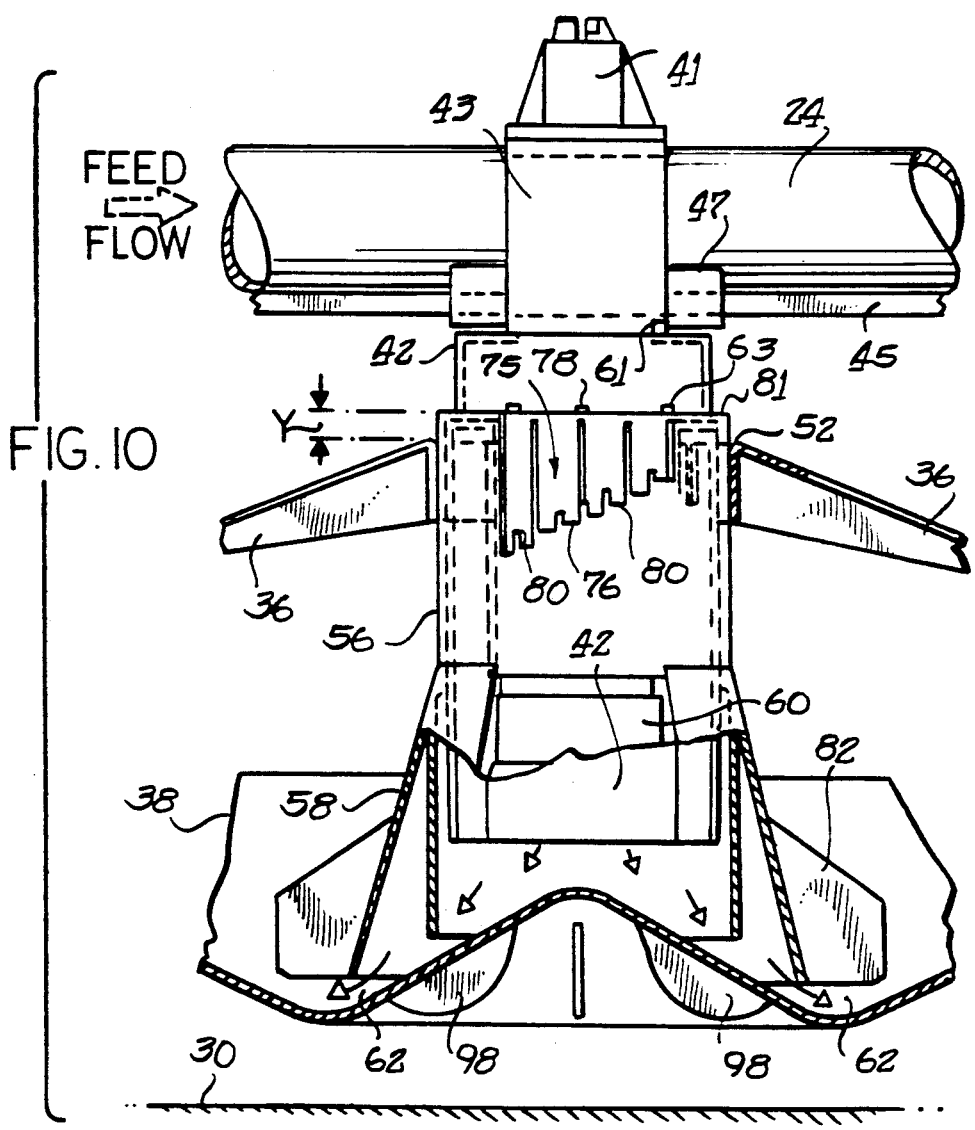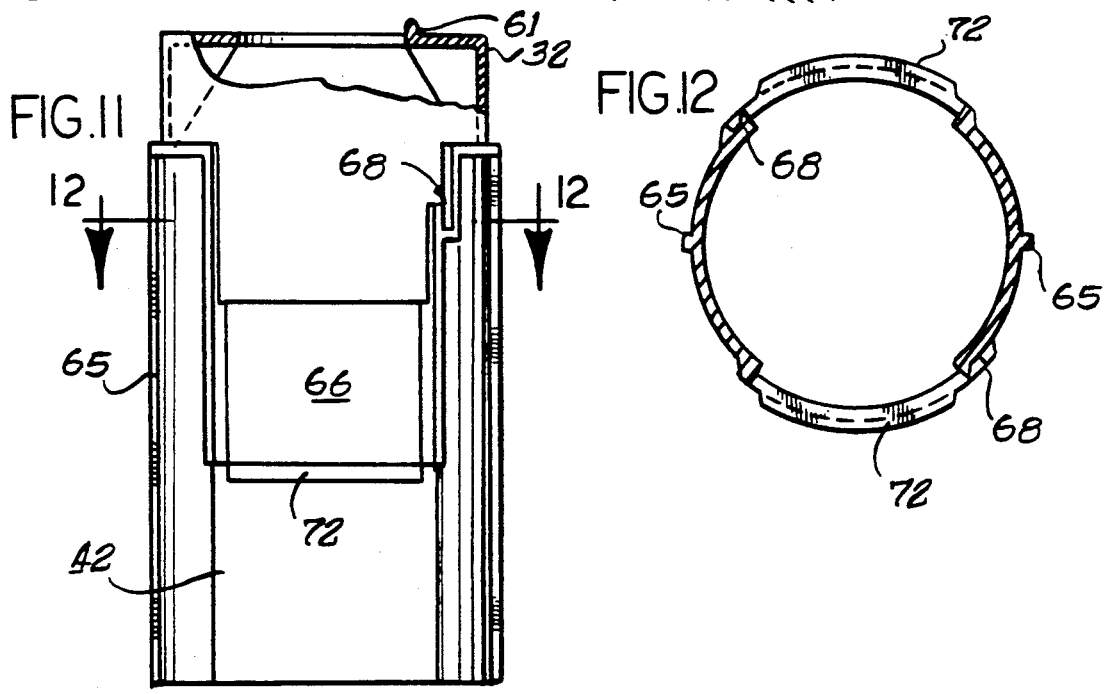

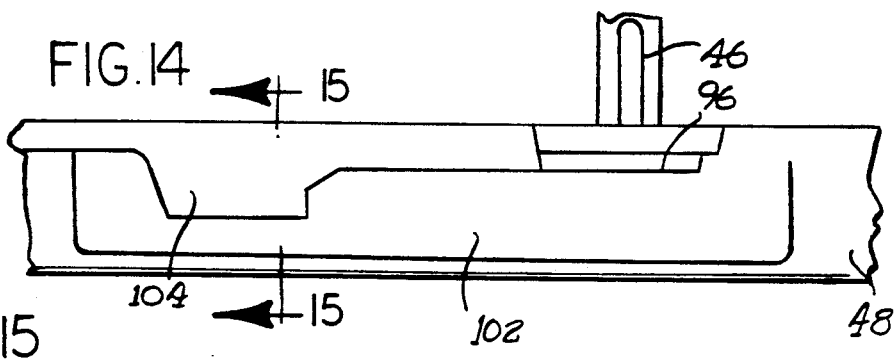
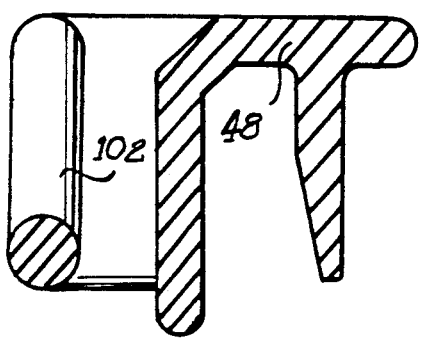
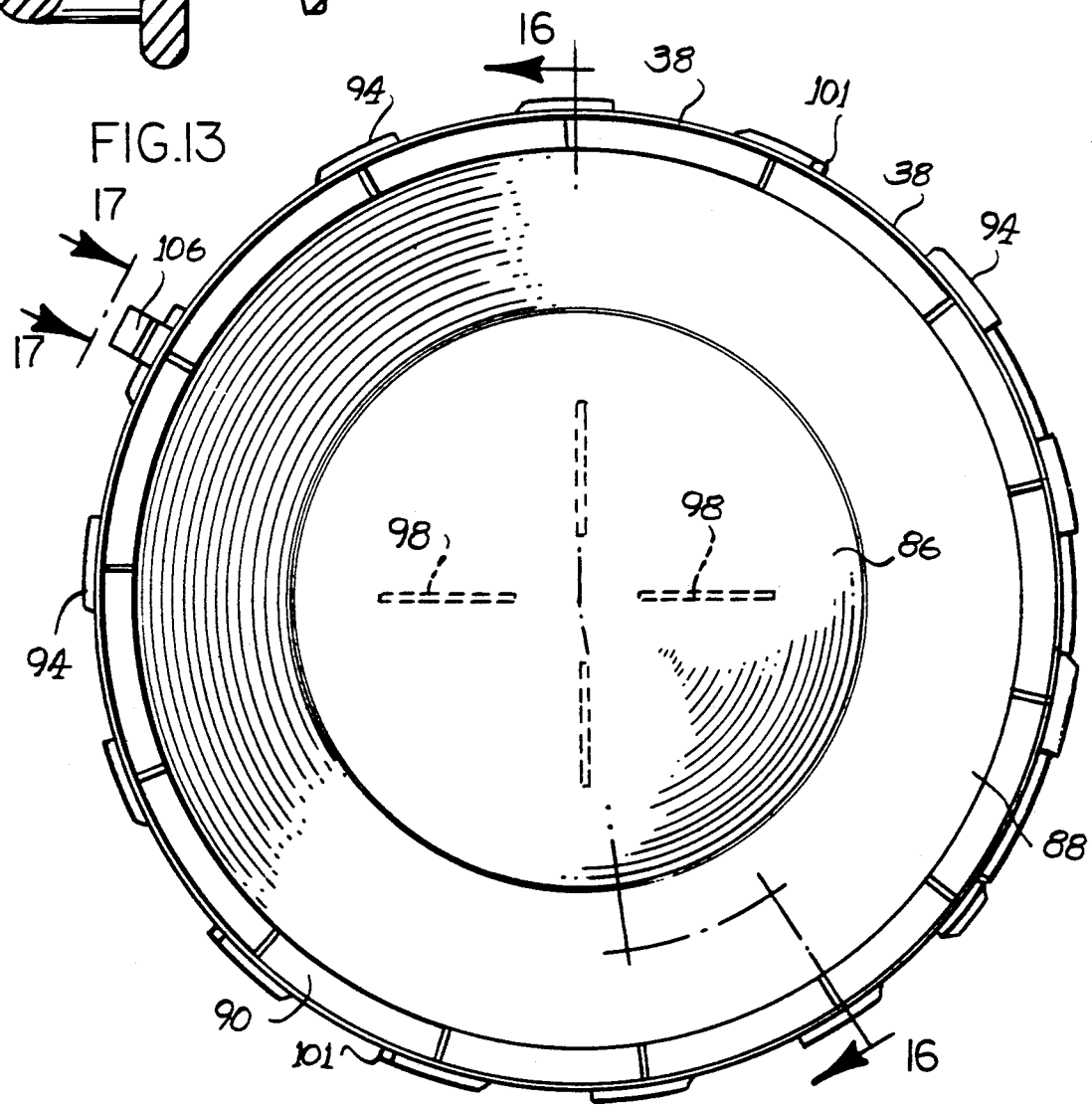

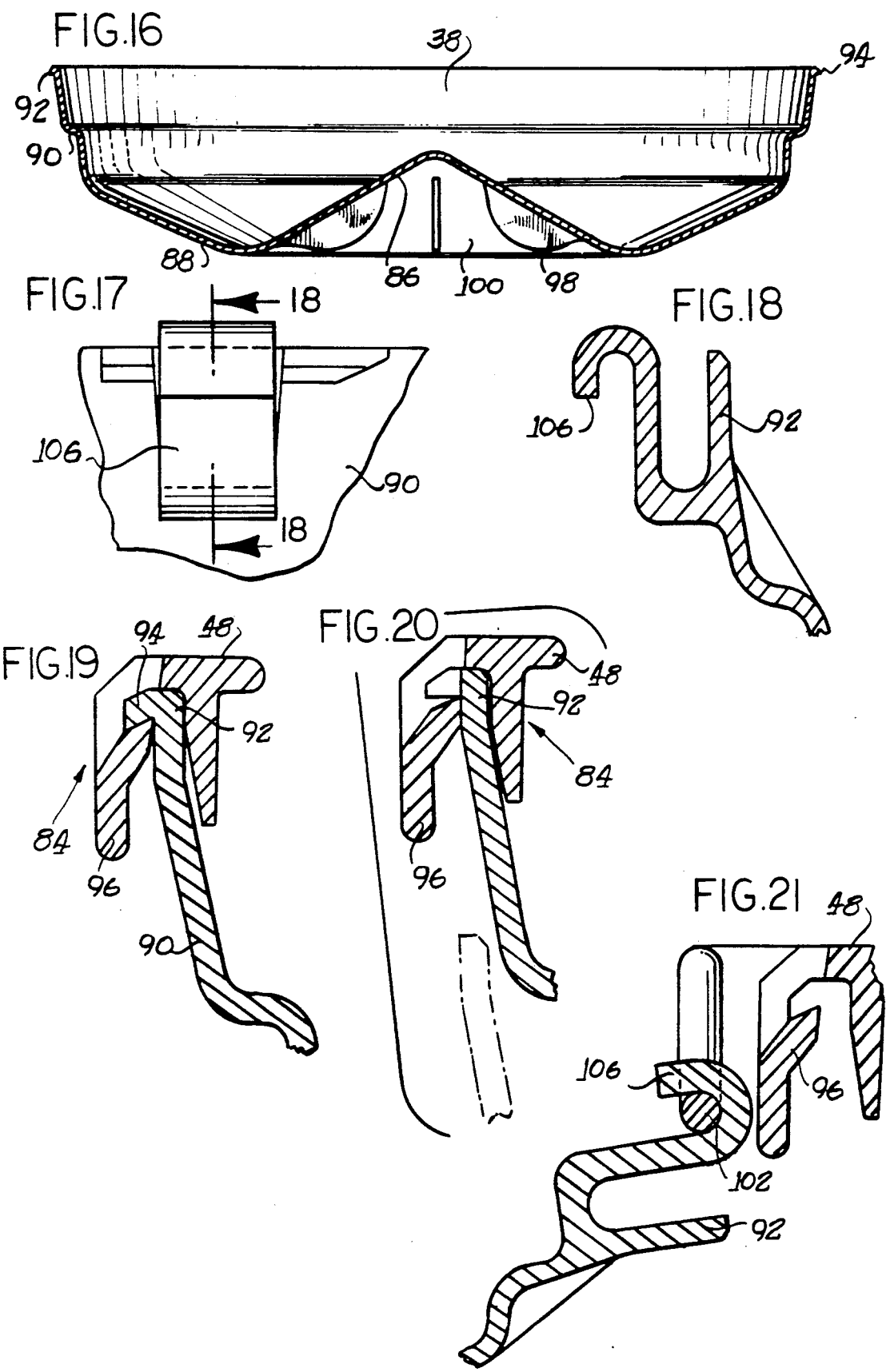

POULTRY FEEDER

BACKGROUND OF THE INVENTION

This invention relates generally to feeding systems for poultry and the like, and more particularly to the feeder assemblies used in conjunction therewith.

In today's competitive marketplace, most animal husbandmen attempt to reduce the operating costs associated with the commercial breeding of domestic birds and animals by utilizing automated feeding systems designed to minimize the amount of labor needed to carry out daily feeding procedures. A modern automated feeding system of the type referred to usually comprises a bulk feed storage facility connected to a system of transport conduits which are equipped with means for conveying feed through the conduits and into the individual feeder assemblies. In poultry feeding applications, a single feeder should ideally be able to accommodate various types and sizes of birds thus eliminating the need and expense required to change feeders. The feeder assemblies should also be designed to minimize feed waste and discourage birds from bodily entering the feeder assemblies and contaminating the feed contained therein.

Examples of prior art feeder assemblies of the general type to which this invention is directed are disclosed in U.S. Pat. Nos. 3,230,933; 3,388,690; 3,511,215; 3,811,412; 3,911,868; 4,070,990; 4,476,811; 4,834,026 and U.S. patent application Ser. No. 302,015.

The feeders shown in U.S. Pat. Nos. 3,230,933; 3,388,690 and 4,476,811 disclose, among other things, the aspect of providing a wire barrier to prevent consuming poultry from physically climbing into the feeder apparatus. Because of the shape and configuration of the barriers shown, however, birds which force their way into the feeder apparatus can become trapped inside. Another aspect shown in U.S. Pat. No. 4,476,811 is that of a brood gate opening defined in the drop tube member to permit feed to flow from a transport conduit, through the opening, and into an outer portions of the pan for consumption by poultry which are newly-hatched and/or not yet large enough to feed from the interiors of the pan. When the '811 feeder is raised above a feeding surface as shown in FIGS. 4 and 5 of the '811 patent, the brood gate automatically closes. The brood gate shown in U.S. patent application Ser. No. 302,015, however, can be opened and closed whether or not the feeder assembly shown therein is raised above a feeding surface or resting thereon, but will not automatically close and open.

Except with respect to those aspects specifically discussed above, it is believed that a concise explanation as to the potential relevance of each of the prior art patents cited is provided by the title and abstract of each.

OBJECTS AND SUMMARY OF THE INVENTION

It is a general objective of the present invention to provide apparatus for feeding large numbers of birds and animals in an effective and efficient manner.

It is an associated objective to provide a poultry feeder having a barrier for preventing birds and animals from bodily climbing into the feeder yet simultaneously allowing those that do force their way inside to easily exit without sustaining injury or damaging the feeder apparatus.

It is a related object to provide a poultry feeder including a brood gate which will automatically close when the feeder assembly is elevated above a feeding surface, and automatically open when the feeder assembly is lowered onto a feeding surface, but which can also be locked to remain open when the feeder assembly is elevated.

It is yet another object of the present invention to provide a feeder which includes means for preselecting the size of a lower feed gate which automatically results when the feeder assembly is raised above a feeding surface.

It is a collateral object of the present invention to provide means for visually indicating the size of the lower feed gate opening which has been preselected.

Still another object of the present invention is to provide a feeder with a rotatable coupling means for selectively connecting a pan member component and a barrier means component which allows the pan to be simultaneously disconnected and suspended from the barrier means when so desired.

Still another important object of the present invention is to provide a poultry feeder with means for eliminating or limiting rotation of the feeder assembly with respect to a feed supply conduit, thereby preventing consuming poultry from spilling feed onto the feeding surface.

Other objects and advantages of the invention will become apparent upon reading the following detailed description and upon reference to the drawings. Throughout the description, like reference numerals refer to like parts.

Summarily stated, the invention comprises a feeder assembly for birds or animals having feeder tube means for directing feed into the assembly, said feeder tube means being operatively associated with a feed conveyor and means for raising and lowering the assembly with respect to a feeding surface; a pan member for containing and presenting feed; wherein a cone means can be provided loosely surrounding the feeder tube for controlling the pattern and amount of feed presented by the assembly; and wherein indexing means can be provided for enabling the preselection of a vertical distance automatically resulting between the cone means and the pan member when the feeder assembly is suspended above the feeding surface. The assembly may further comprise indication means to visually mark said preselected vertical distance. A brood gate may also be provided which is designed to automatically close upon elevation of the feeder assembly, yet can be locked open when so desired. Rotatable coupling means may also be provided for engaging and disengaging the pan member and the barrier means by simply rotating one with respect to the other, and for allowing simultaneous suspension of the pan member from the barrier means when desired. In addition, the barrier means has a profile and spoke design which facilitates the exit of birds or animals which force their way inside the assembly and makes it easier for the birds or animals to get out than it was for them to get in.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following descriptions taken in connection with the accompanying drawings, in which:

FIG. 1 is a perspective view of an automated feeding system incorporating the present invention;

FIG. 2 is an elevational side view of the present invention shown in operative association with a system branch line;

FIG. 3 is a plan view of the grill means component of the invention;

FIG. 4 is a sectional view taken along line 4—4 of FIG. 3;

FIG. 5 is a sectional view taken along line 5—5 of FIG. 3;

FIG. 6 is a sectional view taken along line 6—6 of FIG. 5;

FIG. 10 is an elevational side view of the present invention, partially in section, and partially broken away, shown in operative association with a system branch line and elevated above a feeding surface;

FIG. 11 is a partial elevational view of the feeder tube component of the invention, partially broken away;

FIG. 12 is a sectional view taken along line 12—12 of FIG. 11;

FIG. 13 is a plan view of the pan member component of the invention;

FIG. 14 is a sectional view taken along line 14—14 of FIG. 3;

FIG. 15 is a sectional view taken along line 15—15 of FIG. 14;

FIG. 16 is a sectional view taken along line 16—16 of FIG. 13;

FIG. 17 is a sectional view taken along line 17—17 of FIG. 13;

FIG. 18 is a sectional view taken along line 18—18 of FIG. 17;

FIGS. 19-20 illustrate the rotational coupling means feature of the invention; and FIG. 21 illustrates the "swing-down" pan member suspension feature of the invention.

DETAILED DESCRIPTION OF THE ILLUSTRATED INVENTION

Figure 2A:
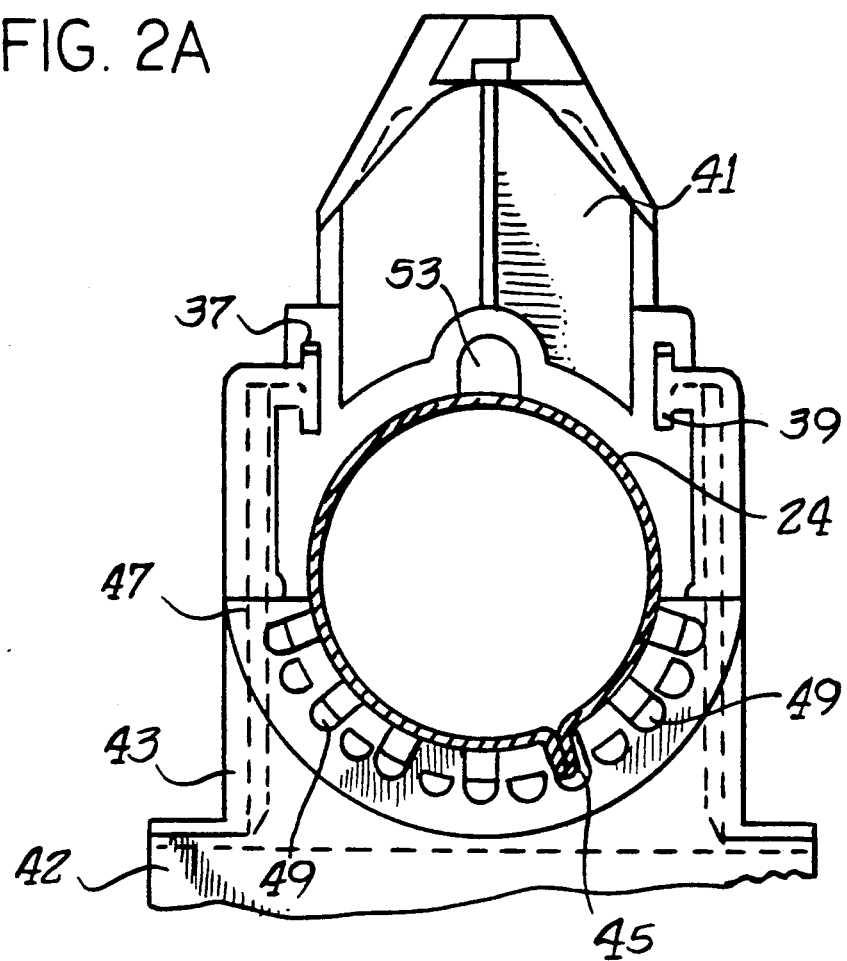
FIG. 2A is a partial elevational view illustrating a two-piece top member with multiple-slot locking insert aspect of the invention in operative association with a system branch line.

While the invention will be described in connection with a preferred embodiment, it will be understood that it is not intended to limit the invention of that embodiment. On the contrary, it is intended to cover all alternatives, modifications and equivalents as may be included within the spirit and scope of the invention.

Turning first to FIG. 1, several feeders of the present invention 10 are shown in conjunction with a modern automated feeding system 12 and an associated feeding house 14. Apart from the individual feeders 10, the automated feeding system 12, (shown only in part in FIG. 1) comprises a bulk feed storage bin 16, a main transport conduit 18, a drop tube 20, a hopper 22 and a branch line 24. These components, of course, enable feed supplied to the bulk feed storage bin 16, by truck for example, to be delivered to the individual feeders 10. The automated feeding system 12 also includes helical conveying elements (not shown) located inside the main conduit 18 and branch line 24 for urging the feed through the system and insuring proper delivery of predetermined amounts of feed to each feeder 10. Support joist 26 and pulley cables 28 are also provided within the feeding house 14 to enable the vertical adjustment of the hopper 22, branch line 24 and feeders 10 with respect to a feeding surface 30. It should be noted that drop tube 20 is preferably constructed of a flexible material so as to allow vertical expansion and contraction in accordance with the vertical adjustment of the feeders 10 above the feeding surface 30 as discussed above.

FIG. 2 illustrates an individual feeder unit 10 operatively associated with a portion of a branch line 24. Each individual feeder 10 comprises a feeder tube 32, a cone member 34, a grill means 36 and a pan member 38. Preferably, the feeder tube 32 has a two-piece top member 40 which loosely surrounds the branch line 24 and provides access to the feed delivered thereby. As further described below, the two-piece top member 40 comprises a cap 41 and a base 43 slideably connected, as illustrated best in FIG. 2A, on track member 37 and rail 39 so as to enable manual separation therebetween and greatly facilitate installation and removal of the individual feeders 10 from the branch lines 24.

Referring back to FIG. 2, it can be seen that each branch line 24 further includes a structural rib 45 which is interrupted only where the branch line 24 interconnects with the individual feeders 10. At these locations, dispensing apertures (not shown) are formed in a lower portion of the branch line 24 in order to allow feed delivered by the branch line 24 to descend into a lower cylindrical portion 42 of the feeder tube 32, and hence into the pan member 38, in a manner discussed more thoroughly below.

From the foregoing description, it should be apparent that without additional restraint, the individual feeders 10 are free to rotate about the branch line 24 when suspended above the feeding surface 30 by joints 26 and cables 28. In certain applications, however, this freedom of rotation may be undesirable. Therefore, in order to prohibit such rotation, and thereby prevent consuming poultry from spilling feed onto the feeding surface 30, the feeders 10 can also be provided with a locking insert means 47, best illustrated in FIG. 2A. Once the feeders 10 have been properly positioned on the branch line 24, the branch line rib 45 can be engaged in one of the several slots 49 formed in the locking insert 47. Attempts to rotate the feeder 10 about the branch line 24 will now cause the rib 45 to bear against the locking insert 47 which is securely held in place by compression from the branch line 24, and such rotation will thereby be prevented.

Figure 2B:
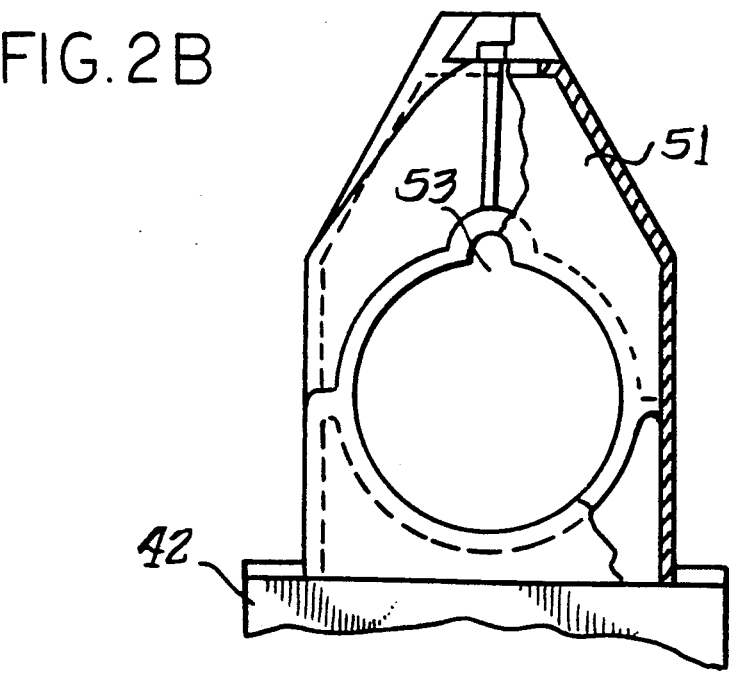
FIG. 2B is an elevational view of a one-piece top member.

In other feeding applications where allowing such rotation may be desirable, however, the locking insert 47 can simply be eliminated. Moreover, when instant installation and removal of the feeders 10 from the branch lines 24 is not essential, a one-piece top member 51 can be incorporated into the feeder assembly 10 as shown in FIG. 2B. In either case, the feeders 10 can be installed and removed from an end of a branch line 24 by sliding the rib 45 along a groove 53 formed in at the top of the branch line access opening of the top members 40 and 41 until the feeder 10 is located over a dispensing opening in the branch line 24, at which time the feeder can be rotated down into proper position.

In accordance with one important feature of the present invention, the grill means 36 comprises a central hub portion 44, radially projecting spokes 46 and a perimeter ring 48. With reference to FIGS. 2 and 3, it can be seen that the central hub 44 loosely surrounds the cone member 34 and that the individual spokes 46 radially project outward therefrom at spaced intervals in a substantially horizontal direction, until turning downward to extend in a substantially vertical direction before joining with the perimeter rim 48. Accordingly, as can be envisioned by reference to FIG. 5, the profile of each spoke members 46, in combination with the central hub 44, define an annular area 50 within the feeder 10 of significantly greater dimension in both height and depth than existed in comparable prior art feeders such as those discussed above. In addition, as shown in FIGS. 4 and 6, spoke members 46 have a T-shaped cross sectional area throughout their length which adds strength and rigidity to the grill means 36. While it is undesirable for feeding birds or animals to force their way past the grill means 36 and gain access into the annular feeding area 50, such activity inevitably occurs. With the benefits of the combined effects of the above-described features, however, birds and animals that do find their way inside have sufficient room to maneuver past and get out of the grill means 36 easier than it was for them to get in, without suffering injury and/or damaging the feeder.

It should also be noted at this juncture that the central hub portion 44 of the grill means 36 is also provided with a rim 52 (FIG. 3) having pegs 54 projecting radially inward therefrom and toward the cone member 34. Furthermore, adjacent each series of pegs 54, a visual indication means 55 is located on the hub portion 44 which, as illustrated, comprises a series of numerical indicia 57.

Figure 7:
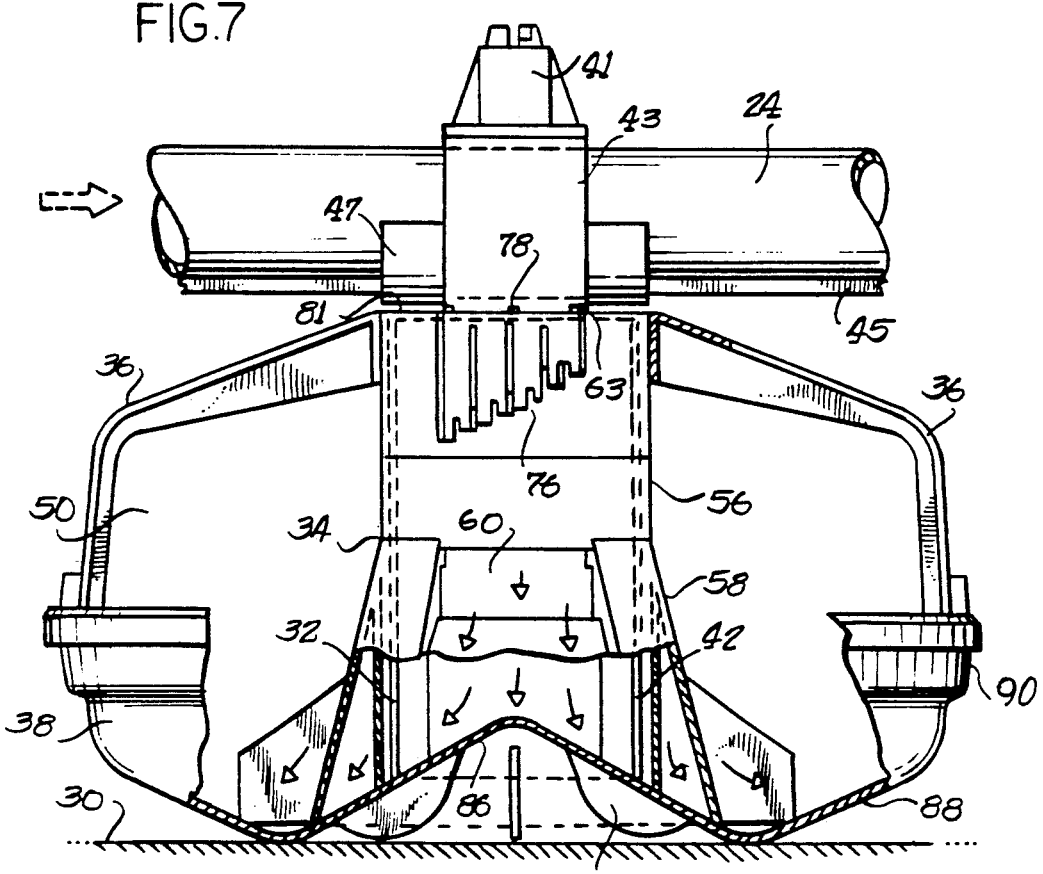
FIG. 7 is an elevational side view of the present invention, partially in section, shown in operative association with a system branch line.
Figure 8:
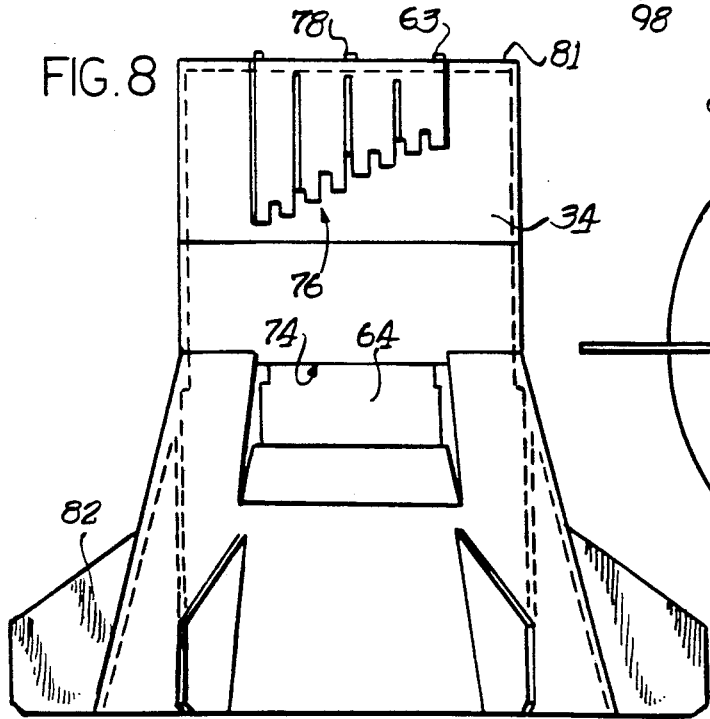
FIG. 8 is an elevational view of the cone means component of the invention.
Figure 9:
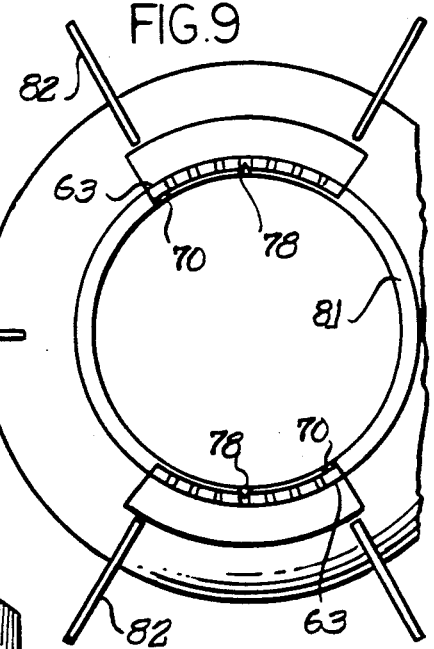
FIG. 9 is a plan view of the cone means component of the invention, partially broken away.

In accordance with yet another important feature of the invention, best seen in FIGS. 7, 8 and 9, the cone member 34 loosely surrounds the feeder tube 32 and includes a cylindrical top section 56 which is formed integral with a truncated cone-like bottom section 58. In general, the cone member 34 allows for feeding versatility from a single feeder unit 10 by providing both an upper feed gate 60 and a lower feed gate 62 (FIG. 10) for filling the pan member 38 with feed. More specifically, the cone member 34 includes a window 64 (FIG. 8) which can be brought into and out of alignment with a corresponding aperture 66 (FIG. 11) formed in the lower cylindrical portion 42 of the feeder tube 32 to divert feed into the pan member 38 in the manner depicted by the arrows shown in FIG. 7. This upper feed gate 60 is most useful in feeding brood-sized birds and animals which, because of their relatively small size, require the feed to be presented in a pile near the perimeter of the pan 38 in order to gain access thereto.

Ordinarily, when the feeder unit 10 is resting on the feeding surface 30 as shown in FIG. 7, the feeder tube aperture 66 and the cone window 64 are in alignment and the upper feed gate 60 is in an open position. Conversely, when support joist 26 and pulleys 28 are employed to raise the feeder unit 10 into a suspended position above the feeding surface 30, as shown in FIG. 10, feeder tube aperture 66 and cone window 64 will normally slide vertically out of alignment with one another and the upper feed gate 60 will automatically close. In some situations, however, it may be desirable to keep the upper feed gate 60 open, even when the feeder 10 is suspended above the feeding surface 30. To accomplish this result, feeder tube 32 and cone member 34 are provided with cooperating pairs of hooks 68 (FIGS. 11-12) and latches 70 (FIG. 9), respectively. The hooks 68 and latches 70 can be engaged by manually rotating the feeder tube 32 with respect to the cone member 34, and function to lock the vertical relationship therebetween such that the feeder tube 32 and cone member 34 will rise in unison holding the upper feed gate 60 in an open position and preventing automatic closure thereof upon elevation of the feeder 10 above the feeding surface 30.

As discussed above, when hooks 68 and latches 70 are not positioned for engagement, the upper feed gate 60 will automatically close upon operation of the pulley 28 which causes the feeder tube 32 to slide upward relative to the remaining components of the feeder 10. In order to prevent further relative upward movement of the feeder tube 32 once the upper feed gate 60 is closed, the feeder tube is provided with a lip means 72 (FIGS. 11-12) which is designed to contact an upper edge 74 (FIG. 8) of the cone member window 64 thereby joining the feeder tube 32 and cone member 34. Further, vertical movement will cause the feeder tube 32 and cone member 34 to move in unison, similar to when hooks 68 and latches 70 are engaged, but now the upper feed gate 60 will be closed.

Indicator tabs 61 and 63 are provided (as best shown in FIG. 2) on the feeder tube 32 and cone rim 81, respectively, to give visual indication of whether these components are positioned to "lock" the upper feed gate 60 open, or allow it to slide shut. For exemplary purposes only, as illustrated in FIG. 2, an "automatic-close" position is indicated when the indicators 61 and 63 are stacked. When the indicators 61 and 63 are offset, however, the upper feed gate 60 will lock-open upon elevation of the feeder assembly 10 above the feeding surface 30.

Alignment bars 65 (FIGS. 11 and 12) are also provided on the feeder tub 32 to facilitate alignment of the feeder tube 32 and cone member 34 and also serve to minimize the entry of dust when the components are adjusted with respect to one another.

Once the upper feed gate 60 has either locked open or slid shut, still further evaluation of the feeder assembly 10 causes the lower feed gate 62, which is generally associated with feeding larger birds and animals, to open as the feeder tube 32 and the cone member 34 move above the pan member 38 as shown in FIG. 10.

The extent to which the lower gate 62 opens, however, is dependent upon the relative rotational relationship between the cone member 34 and the grill means 36 due to the provision of an indexing means 75. More specifically, the indexing means 75 comprises a pair of graduated guide set 76 (only one shown) disposed on cone top section 56 which operate in conjunction with pegs 54 located on grill means rim 52 and projecting radially inward therefrom (FIG. 3). The operation of the graduated guide sets 76 and pegs 54 is easily understood upon reference to FIGS. 7-10, upon close inspection of which it will be observed that the vertical extent of each groove 80 of the graduated guide sets 76 is different. Accordingly, rotating the cone member 34 with respect to the grill means 36 determines which set of grooves 80 will match up with pegs 54 thereby presetting the extent to which the lower feed gate 62 will open. After the pegs 54 are positioned in grooves 80, further vertical movement of the pulleys 28 will cause the entire feeder unit 10 to be elevated, and will no longer affect the size of the lower feed gate 62. From this point on, only the vertical distance between the pan 38 and feeding surface 30 will increase.

As noted earlier, visual indication means 55 comprising a series of numerical indicia 57, illustrated in FIG. 3 as Nos. 1-6, is provided on hub portion 44 of grill means rim 52. In addition, the cone member 34 is provided with indicator arrows 78 disposed along a top rim 81 thereof as best shown in FIG. 9. So arranged, it should be apparent that the extent to which the lower feed gate 62 has been preset to open to can be indirectly obtained by viewing the numerical indicia 57 and indicator arrows 78 when direct observation of the lower feed gate opening 62 is covered by feed in the pan 38. Moreover, the exact height of the lower feed gate opening 62 can be observed by noting the distance between the grill means rim 52 and the cone member rim 81 as indicated by the letter "Y" in FIG. 10.

It should also be noted that the cone means 34 further includes dividers 82 to minimize feed waste and raking by limiting the portion of feed to which each bird or animal has access.

Still another important aspect of the present invention is a rotatable coupling means 84 (FIGS. 19-20) for engaging and disengaging the grill means 36 and the pan member 38. As shown in FIG. 13, the pan member 38 comprises a conical central bottom portion 86, contoured intermediate area 88 and cylindrical side wall 90. The sectional side view of the pan member 38 illustrated in FIG. 16, further illustrates that the side wall 90 terminates at a top rim 92 which includes intermittent barbs 94. The operation of the rotatable coupling means 84 will be apparent on reference to FIGS. 19 and 20 where it is shown that the grill means perimeter ring 48 includes intermittent rails 96 which cooperate with the intermittent barbs 94 of the pan member 38 once the pan rim 92 has been positioned beneath the grill means perimeter ring 48 and rotated into place.

To facilitate manual rotation of the pan member 38 with respect to the grill means 36, finger tabs 98, best seen in FIG. 16, are also provided on the pan member 38 extending downward from an exterior surface 100 thereof. Finger tabs 98 also aid in stacking and shipping of the feeder units 10.

Pan stops 101 are also provided adjacent selected intermittent barbs 94 as shown in FIG. 13 to limit rotation of the pan rim 92, once engaged.

The present invention further includes a pan member "swing-down" feature which allows the pan member 38 to be simultaneously disengaged from the grill means 36 and suspended therefrom in a single motion. The "swing-down" feature facilitates cleaning of the pan 38 and is most easily understood by reference first to FIGS. 3, 14-15 which show a fragmented portion of the grill means perimeter ring 48, having a rack means 102 provided thereon. The rack means 102 extends radially outward of the perimeter ring 48 for a limited arc covering a single intermittent rail 96 as illustrated. Rack stops 103 are also provided as illustrated to limit rotation.

A notch 104 is formed in the rack means 102 at a point thereon away from the intermittent rail 96. Provision of the notch 104 allows for engagement of a hook member 106 provided on the pan sidewall 90 as shown in FIGS. 17-18. To engage the hook 106 on the rack means 102 the pan member 38 is turned upside down and the hook 106 is slid upward between the rack means and the perimeter ring 48. Returning the pan member to a right side up position completes the engagement.

The rack means 102 and hook member 106 engagement will not interfere with the operation of the rotatable coupling means 84 discussed above. Now when the rotatable coupling means 84 is disengaged, however, the hook member 106 can be positioned over the notch 104 of the rack 102 and the pan member 38 will automatically fall into a suspended position as shown in FIG. 21. The "swing-down" suspension feature therefore provides a quick and easy one-step method to position the feeders for cleaning and/or periods of non-use.

The invention is claimed as follows:

1. A feeder assembly for birds or animals operatively associated with a feed conveyor and means for raising and lowering said feeder assembly and said feed conveyor with respect to a feeding surface, said feeder assembly comprising:
   a. feeder tube means for directing feed downwardly from the feed conveyor;
   b. cone means loosely surrounding said feeder tube means for controlling a pattern and amount of feed within the assembly;
   c. a pan member for containing and presenting feed;
   d. grill means for preventing consuming birds and animals from bodily climbing into said assembly;
   e. upper and lower fed gate means for diverting feed from said feeder tube means into said pan member, said lower feed gate automatically opening when said feeder assembly is raised above said feed surface, and said upper feed gate automatically closing when said feeder assembly is raised above said feeding surface; and
   f. means for locking said upper feed gate in an open position to prevent automatic closure thereof when said feeder assembly is raised above said feeding surface.

2. The feeder assembly recited in claim 1, wherein indexing means are provided for preselecting the size of the lower feed gate opening when said feeder assembly is raised above said feeding surface and visual indication means are provided for indicating the size of the lower feed gate selected at all times.

3. The feeder assembly recited in claim 1, wherein said grill means comprises a plurality of spaced, spoke members having an inverted L-shaped profile and T-shaped cross-section thereby defining a rectangular area within the assembly and making it easier for birds and animals to climb out of the feeder than to climb in.

4. The feeder assembly recited in claim 1, wherein a lower portion of said cone means is provided with circumferentially projecting dividers for segmenting feed contained by said pan member and thereby minimizing feed waste.

5. The feeder assembly recited in claim 1, further comprising a rotatable coupling means for engaging and disengaging said pan member and said grill means by way of changing a relative rotational relationship therebetween.

6. The feeder assembly recited in claim 5, wherein said pan member further comprises tab means projecting from an exterior surface of the pan member to facilitate manual rotation of said pan member for engagement and disengagement with said grill means.

7. The feeder assembly recited in claim 5 further comprising means for simultaneously disengaging said rotatable coupling means and suspending said pan member from said grill means to facilitate cleaning the pan member.

8. The feeder assembly recited in claim 1, further comprising locking insert means operatively associated with said feed conveyor for prohibiting rotation of said feeder assembly about said feed conveyor when said assembly is suspended above a feeding surface.

9. The feeder assembly recited in claim 1, wherein said feeder tube means further comprises a two-piece top for connecting said assembly to said feed conveyor, said two-piece top having track and rail members for slideably engaging the two pieces together.

10. A poultry feeder comprising a pan member operatively associated with feeder tube means and a feed conveyor system; barrier means for discouraging feeding poultry from climbing into the pan member; and rotatable coupling means for engaging and disengaging said pan member and said barrier means by changing a relative rotational relationship existing therebetween.

11. The poultry feeder recited in claim 10, wherein said pan member further comprises exterior tab means to facilitate manipulation of the relative rotational relationship between the pan member and the barrier means.

12. The poultry feeder recited in claim 10, wherein said feeder further comprises a swing-down hanger means for simultaneously vertically suspending said pan member from said barrier means at the same time said rotatable coupling means is disengaged to facilitate cleaning of the pan member.

13. The poultry feeder recited in claim 10, further comprising cone means loosely surrounding said feeder tube means and indexing means for selectively incrementally adjusting a lower feed gate formed between said pan member and said cone means.

14. The poultry feeder recited in claim 13, wherein said barrier means comprises a series of spaced spoke members extending from a lower perimeter of said barrier means to a central hub member thereof loosely surrounding said cone means, and wherein said spoke members have an angle of profile of approximately 90° and T-shaped cross-sections thereby permitting consuming poultry to exit the pan member more easily than gaining access thereto.

15. The poultry feeder recited in claim 10, wherein said upper and lower feed gates are provided for the passage of feed between said feeder tube means and said pan member and wherein said upper feed gate can be locked in an open position to prevent automatic closure thereof when said poultry feeder is suspended above a feeding surface.

16. The poultry feeder recited in claim 10, further comprising locking insert means operatively associated with said feed conveyor system for fixing the rotational relationship between said poultry feeder and said feed conveyor system and thereby preventing consuming birds and animals from spilling feed from the feeder when suspended above a feeding surface.

17. The poultry feeder recited in claim 10, wherein said feeder tube means further comprises a two-piece top having cap and base members selectively engaged and disengaged by way of a sliding mechanism for surrounding said feed conveyor system.

18. Feeder apparatus comprising: a feeder tube operatively associated with a feed conveyor; a feed pan for providing access to the feed having a substantially circular perimeter of predetermined diameter; and a cage-like barrier having a central hub portion and a series of spoke members having an inverted L-shaped profile and T-shaped cross-section extending between said central hub and a substantially circular lower perimeter portion having a diameter similar to the diameter of said circular perimeter of said feed pan to define a rectangular area within the assembly which makes it easier for birds or animals to climb out of the feeder apparatus than to climb in.

19. Feeder apparatus as recited in claim 18, further comprising a rotatable coupling means for engaging and disengaging said feed pan and said cage-like barrier by way of rotating said feed pan with respect to said cage-like barrier and then reversing said rotation, respectively.

20. Feeder apparatus as recited in claim 19 wherein said feed pan has tabs projecting from a bottom surface thereof to facilitate manual rotation and operation of said rotatable coupling means.

21. Feeder apparatus as recited in claim 18, further comprising hanger means for simultaneously suspending said feed pan from said lower perimeter of said cage-like barrier upon disengaging said rotatable coupling means.

22. Feeder apparatus as recited in claim 18, wherein said feeder apparatus and said feed conveyor are adapted for elevation above a feeding surface and wherein said feeder apparatus further comprises cone means loosely surrounding said feeder tube and indexing means enabling preselection of the height of a lower feed gate which automatically results between said cone means and said feed pan when said feeder apparatus is elevated above said feeding surface.

23. Feeder apparatus as recited in claim 22, further comprising an upper feed gate for the passage of feed between said feeder tube and said feed pan, wherein said upper feed gate can be locked in an open position to prevent automatic closure thereof when said feeder apparatus is elevated above said feeding surface.

24. Feeder apparatus as recited in claim 22, wherein a lower portion of said cone means is provided with circumferentially projecting separating members for dividing feed contained by said feed pan into sections thereby minimizing feed waste.

25. Feeder apparatus as recited in claim 22, further comprising visual indication means for marking the preselected height of the lower feeder gate at all times.

26. Feeder apparatus as recited in claim 18, further comprising locking insert means operatively associated with said feed conveyor for prohibiting rotation of said feeder apparatus about said feed conveyor.

27. Feeder apparatus as recited in claim 18, wherein said feeder tube further comprises a slideably connectable two-piece top for interconnecting said feeder tube and said feed conveyor.

* * * * *